United States Patent
Zheng et al.

(10) Patent No.: US 8,953,557 B2
(45) Date of Patent: Feb. 10, 2015

(54) ROAMING METHOD FOR A MOBILE TERMINAL IN WLAN, RELATED ACCESS CONTROLLER AND ACCESS POINT DEVICE

(75) Inventors: Jun Zheng, Shanghai (CN); Chunyan Yao, Shanghai (CN); Haibo Wen, Shanghai (CN); Fanxiang Bin, Shanghai (CN); Songwei Ma, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 306 days.

(21) Appl. No.: 13/381,260

(22) PCT Filed: Jun. 30, 2009

(86) PCT No.: PCT/CN2009/072559
§ 371 (c)(1),
(2), (4) Date: Dec. 28, 2011

(87) PCT Pub. No.: WO2011/000152
PCT Pub. Date: Jan. 6, 2011

(65) Prior Publication Data
US 2012/0106514 A1    May 3, 2012

(51) Int. Cl.
*H04W 4/00* (2009.01)
*H04W 36/32* (2009.01)
(Continued)

(52) U.S. Cl.
CPC .............. *H04W 36/32* (2013.01); *H04W 60/00* (2013.01); *H04W 36/0033* (2013.01);
(Continued)

(58) Field of Classification Search
CPC . H04W 48/20; H04W 36/00; H04W 36/0005; H04W 36/0011; H04W 36/0016; H04W 36/0033; H04W 36/0055; H04W 36/0072; H04W 36/0077; H04W 60/00

USPC .................................................. 370/331, 332
See application file for complete search history.

(56) References Cited

U.S. PATENT DOCUMENTS 6,473,413 B1 * 10/2002 Chiou et al. .................. 370/331
6,657,981 B1 * 12/2003 Lee et al. ..................... 370/331
(Continued)

FOREIGN PATENT DOCUMENTS

CN     1282167 A     1/2001
CN     1394397 A     1/2003
(Continued)

OTHER PUBLICATIONS

Wen, Yuanbao et al, "A Fast IP Handoff Approach Supporting the VoWlan Applications Based on IAPP," Computer Engineering & Science, vol. 29, No. 1, pp. 38-40, 2007.
(Continued)

*Primary Examiner* — Farah Faroul
(74) *Attorney, Agent, or Firm* — Fay Sharpe LLP

(57) ABSTRACT

A roaming method for a mobile terminal in a wireless local area network is disclosed. In the method, a target access point (AP) device receives an access request for roaming from the mobile terminal, and a target access controller (AC) obtains mobility information of the mobile terminal in an original extended service set based on the access request, wherein the mobility information include information of an AP device, an AC and a mobile agent server associated with the mobile terminal. Then the target AC determines whether the roaming for the mobile terminal is an inter-IP subnet roaming or an intra-IP subnet roaming based on the obtained mobility information. The target AC performs mobile IP based handover when the roaming is determined as the inter-IP subnet roaming and performs Inter Access Point Protocol based handover when the roaming is determined as the intra-IP subnet roaming.

15 Claims, 6 Drawing Sheets

(51) Int. Cl.
*H04W 36/00* (2009.01)
*H04W 60/00* (2009.01)
*H04W 24/00* (2009.01)
*H04W 24/02* (2009.01)
*H04W 36/08* (2009.01)
*H04W 36/14* (2009.01)
*H04W 48/16* (2009.01)
*H04W 80/04* (2009.01)
*H04W 84/12* (2009.01)
*H04W 88/02* (2009.01)
*H04W 88/08* (2009.01)

(52) U.S. Cl.
CPC ............. *H04W 24/00* (2013.01); *H04W 24/02* (2013.01); *H04W 36/08* (2013.01); *H04W 36/14* (2013.01); *H04W 48/16* (2013.01); *H04W 80/04* (2013.01); *H04W 84/12* (2013.01); *H04W 88/02* (2013.01); *H04W 88/08* (2013.01)
USPC .......................................... 370/331; 370/332

(56) References Cited

U.S. PATENT DOCUMENTS

| | | | |
|---|---|---|---|
| 7,082,114 B1 | 7/2006 | Engwer et al. | |
| 8,233,450 B2 | 7/2012 | Zaki et al. | |
| 8,341,700 B2 | 12/2012 | Malinen et al. | |
| 2004/0068668 A1 | 4/2004 | Lor et al. | |
| 2006/0013174 A1* | 1/2006 | Sanda | 370/338 |
| 2006/0245404 A1 | 11/2006 | Bajic | |
| 2007/0002833 A1 | 1/2007 | Bajic | |
| 2010/0182960 A1* | 7/2010 | Valko et al. | 370/329 |
| 2010/0208691 A1* | 8/2010 | Toyokawa | 370/331 |
| 2010/0278122 A1* | 11/2010 | Singh et al. | 370/329 |
| 2011/0110335 A1* | 5/2011 | Weniger et al. | 370/331 |
| 2012/0059944 A1* | 3/2012 | Fernandez Alonso et al. | 709/228 |

FOREIGN PATENT DOCUMENTS

| | | |
|---|---|---|
| CN | 1567868 A | 1/2005 |
| CN | 1691828 A | 11/2005 |
| JP | 2006-222549 A | 8/2006 |
| JP | 2007-508614 A | 4/2007 |
| JP | 2008005551 | 1/2008 |
| JP | 2009-500918 A | 1/2009 |
| WO | WO 2005/036852 A1 | 4/2005 |
| WO | WO 2007/005518 A2 | 1/2007 |
| WO | WO 2008071276 A1 * | 6/2008 |

OTHER PUBLICATIONS

International Search Report for PCT/CN2009/072559 dated Apr. 15, 2010.

* cited by examiner

ROAMING METHOD FOR A MOBILE TERMINAL IN WLAN, RELATED ACCESS CONTROLLER AND ACCESS POINT DEVICE

TECHNICAL FIELD OF THE INVENTION

The invention relates to wireless local area network (WLAN) technology in the communication field, in particular, to roaming technology for a mobile terminal in WALN.

BACKGROUND OF THE INVENTION

In recent years, wireless local area network such as WiFi network has been widely deployed for both private home users and in public hot spots, so as to provide broadband high speed wireless access service to mobile terminals. In the wireless local area network, a single access point (AP) device supporting one or more mobile terminals is referred to as basic service set (BSS), wherein the AP device is identified by basic service set ID (BSSID). Two or more BSS form an extended service set (ESS). Usually one ESS is a single logic network segment (one ESS is within one IP subnet) and is identified by its service set ID.

The common WLAN architecture can be classified as autonomous network architecture and centralized network architecture. In the autonomous WLAN architecture, the AP device is independently managed as a separated network entity and has the function of providing accessibility to the mobile terminals. In the centralized WLAN architecture, it is provided with an access controller (AC) that configures, manages and controls the AP devices and cooperates with the AP devices to provide wireless accessibility to the mobile terminals. In the centralized WLAN architecture, the AP device is also referred to as wireless terminal point (WTP) device. The communication between the access controller AC and the WTP devices it controls utilizes the Control and Provisioning of Wireless Access Points (CAPWAP) protocol, in which two types of MAC models of the WTP device in the centralized WLAN architectures are defined: split MAC model and local MAC model. When the split MAC model is used, the WTP device is mainly used to receive and transmit wireless traffic without processing the received traffic, and the access controller AC performs all operations related to access. When the local MAC model is used, the WTP device executes all the wireless MAC functions.

In order to enable the mobile terminal to move between the different AP devices, Inter Access Point Protocol (IAPP) is proposed and is intended to provide function of moving between the AP devices to the mobile terminal, so as to satisfy mobile terminals' users' increasing need for mobility. However, the IAPP protocol is only applicable to intra-network roaming for the mobile terminal between all the AP devices within one ESS, wherein these AP devices are within the same network segment. According to the IAPP protocol, when the mobile terminal has been successfully associated with a target AP device, the target AP device will send a multicast packet containing MAC address of the mobile terminal to other AP devices in the ESS, so that the other AP devices can update their respective association tables.

Since the IAPP protocol can only enable the mobile terminal to perform the intra-network roaming between all the AP devices within one ESS, mobile IP (MIP) technology is introduced to ensure that the mobile terminal can perform inter-network roaming between different ESSes. The MIP technology enables the mobile terminal to use a fixed IP address to roam between the different IP segments. The MIP technology includes a series of processes such as mobile detection and network registration etc. When the mobile terminal moves from one ESS to another ESS, the original mobile agent server and the target mobile agent server need to exchange information. Generally, the mobile agent server is a general name for home agent (HA) server and foreign agent (FA) server. First, the HA server for the mobile terminal needs to be found, then the original FA server for the mobile terminal is identified by querying a binding table of the HA server, thereby establishing communication between the target FA server and the original FA server. However, the MIP handover would cause handover delay and packet loss, thereby reducing the service quality of the communication traffic (especially the real-time communication traffic).

The MIP technology and the IAPP protocol should be combined to provide a complete solution of roaming for the mobile terminal. Layer 3 MIP should support the IAPP protocol to implement the inter-network roaming. However, for the centralized WLAN architecture, the mobile agent discovery mechanism in the MIP technology cannot work. As mentioned above, the communication between the AC and its WTP devices is based on the Layer 3 tunnel. So Layer 3 function should be supported in a WTP device for both the split MAC model and the local MAC model. However, in case of the MIP technology, the foreign agent should be set in the AC or other higher logic position instead of being set in the WTP device. According to the standard MIP protocol, the time to live (TTL) of mobile agent announcement (MAA) of the MIP is usually set as 1 to avoid multicast storm, which means that the mobile terminal cannot obtain the MAA message sent by the FA server set in the AC due to the Layer 3 isolation of the WTP device. Vice versa, the FA server also cannot obtain the mobile agent solicitation (MAS) message sent by the mobile terminal.

SUMMARY OF THE INVENTION

The present invention is proposed in view of the above technical problems, and its objective is to provide a roaming method for a mobile terminal in a wireless local area network, which enables the mobile terminal to roam between different ESSes or different subnets and provides an efficient mobile management mechanism based on the MIP protocol and the IAPP protocol, especially for the WLAN with centralized network architecture. In addition, the present invention also provides a related Access Controller and an Access Point device.

According to a first aspect of the present invention, there is provided a roaming method for a mobile terminal in a wireless local area network including a plurality of extended service sets (ESSes), each of the plurality of ESSes including at least one access controller (AC) and at least two access point (AP) devices, wherein each access controller is operative to configure, control and manage at least one AP device, the roaming method comprising: a target AP device receiving an access request for roaming from the mobile terminal; a target AC to which the target AP device belongs obtaining mobility information of the mobile terminal in an original ESS based on the access request, wherein the mobility information include information of an AP device, an AC and a mobile agent server associated with the mobile terminal; the target AC determining whether the roaming for the mobile terminal is an inter-IP subnet roaming or an intra-IP subnet roaming based on the obtained mobility information; the target AC performing mobile IP (MIP) based handover when the roaming is determined as the inter-IP subnet roaming; and the target AC performing Inter Access Point Protocol (IAPP) based handover when the roaming is determined as the intra-IP subnet roaming.

According to a second aspect of the present invention, there is provided a roaming method for a mobile terminal in a wireless local area network (WLAN) including a plurality of extended service sets (ESSes), each of the plurality of ESSes including at least two access point (AP) devices, the roaming method comprising: a target AP device receiving an access request for roaming from the mobile terminal; the target AP device obtaining mobility information of the mobile terminal in an original ESS based on the access request, wherein the mobility information include information of an AP device and a mobile agent server associated with the mobile terminal; the target AP device determining whether the roaming for the mobile terminal is an inter-IP subnet roaming or an intra-IP subnet roaming based on the obtained mobility information; the target AP device performing Mobile IP (MIP) based handover when the roaming is determined as the inter-IP subnet roaming; and the target AP device performing Inter Access Point Protocol (IAPP) based handover when the roaming is determined as the intra-IP subnet roaming.

According to a third aspect of the present invention, there is provided an access controller comprising: a receiving module that receives a request for roaming for a mobile terminal from an Access Point (AP) device; a mobility information obtaining module that obtains mobility information of the mobile terminal in an original ESS based on the request, wherein the mobility information include information of an AP device, an AC and a mobile agent server associated with the mobile terminal; a roaming determining module that determines whether the roaming for the mobile terminal is an inter-IP subnet roaming or an intra-IP subnet roaming based on the obtained mobility information; and a handover module that performs Mobile IP (MIP) based handover when the roaming is determined as the inter-IP subnet roaming and Inter Access Point Protocol (LAPP) based handover when the roaming is determined as the intra-IP subnet roaming.

According to a fourth aspect of the present invention, there is provided an access point device comprising: a receiving module that receives an access request for roaming from a mobile terminal; a mobility information obtaining module that obtains mobility information of the mobile terminal in an original ESS based on the request, wherein the mobility information include information of an AP device and a mobile agent server associated with the mobile terminal; a roaming determining module that determines whether the roaming for the mobile terminal is an inter-IP subnet roaming or an intra-IP subnet roaming based on the obtained mobility information; and a handover module that performs Mobile IP (MIP) based handover when the roaming is determined as the inter-IP subnet roaming and Inter Access Point Protocol (IAPP) based handover when the roaming is determined as the intra-IP subnet roaming.

DETAILED DESCRIPTION OF THE PREFERRED EMBODIMENTS

It is believed that the above and other objects, features and advantages of the present invention will be more apparent through the following detailed description of the preferred embodiments of the present invention in conjunction with accompany drawings.

Figure 1:
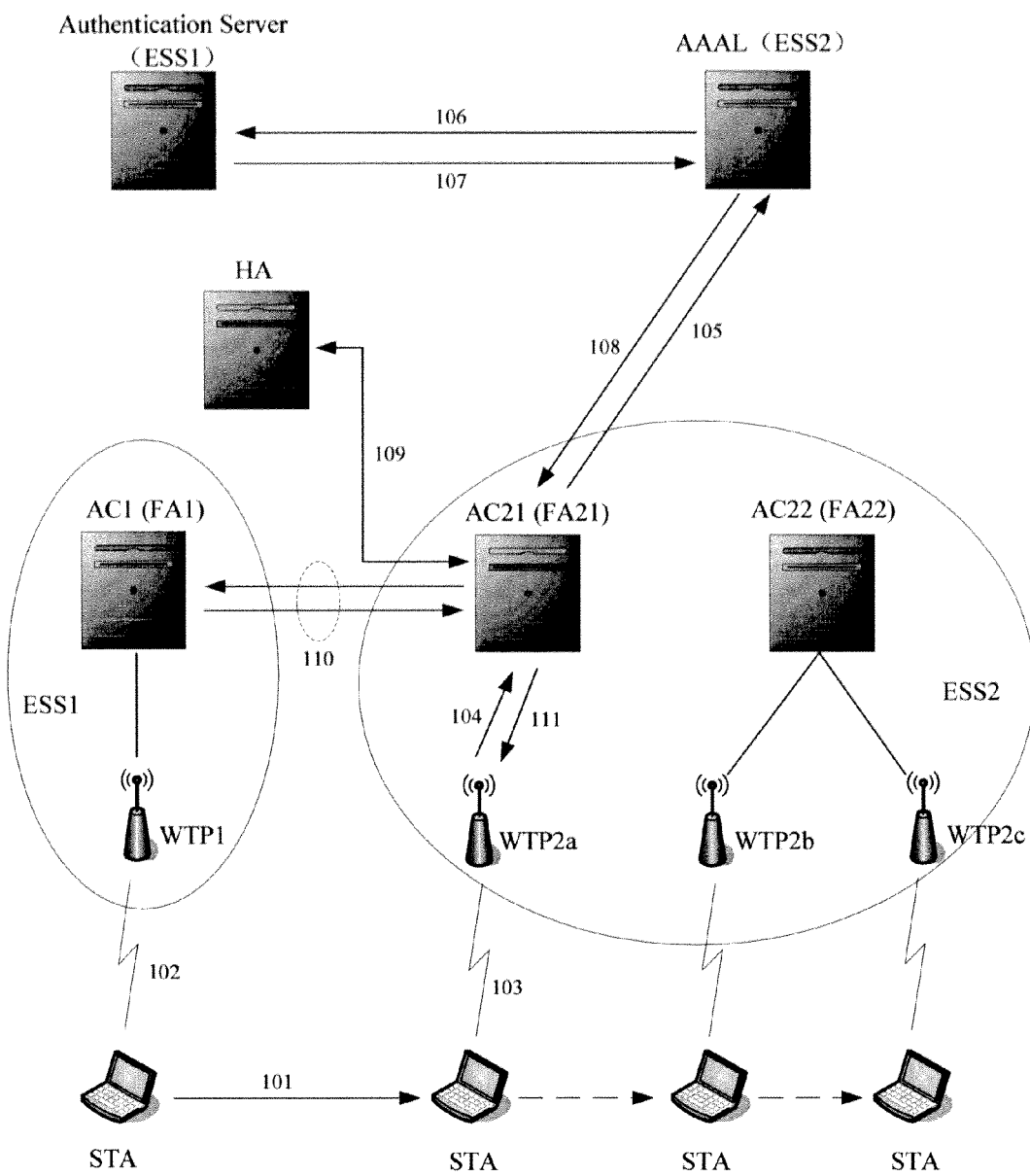
FIG. 1 is a structural diagram of the wireless local area network in which the roaming method for a mobile terminal in the WLAN according to an embodiment of the present invention can be implemented.

FIG. 1 shows a structural diagram of the wireless local area network in which the roaming method for a mobile terminal in the WLAN according to an embodiment of the present invention can be implemented, wherein the WLAN employs the centralized network architecture. As shown in FIG. 1, the WLAN includes a plurality of ESSes (for the sake of simplicity, only two ESSes (ESS1 and ESS2) are shown). The ESS1 includes one access controller AC1 which controls the access point device WTP1. The ESS2 includes two access controllers AC21, AC22. The access controller AC21 controls the access point device WTP2a and the access controller AC22 controls two access point devices WTP2b, WTP2c. Initially, the mobile terminal STA is within the coverage area of the ESS1 and makes access via the AP device WTP1. Then the mobile terminal STA begins to move. When it moves into the coverage area of the AP device WTP2a in the ESS2, the handover for the mobile terminal STA from the AP device WTP1 to the AP device WTP2a occurs (first handover). When the mobile terminal STA continues to move into the coverage area of the AP device WTP2b, the handover for the mobile terminal STA from the AP device WTP2a to the AP device WTP2b occurs (second handover). When the mobile terminal STA continues to move into the coverage area of the AP device WTP2c, the handover for the mobile terminal STA from the AP device WTP2b to the AP device WTP2c occurs (third handover). Each of the above handovers may be performed through the following roaming method for a mobile terminal in a wireless local area network described with reference to FIG. 2.

Figure 2:
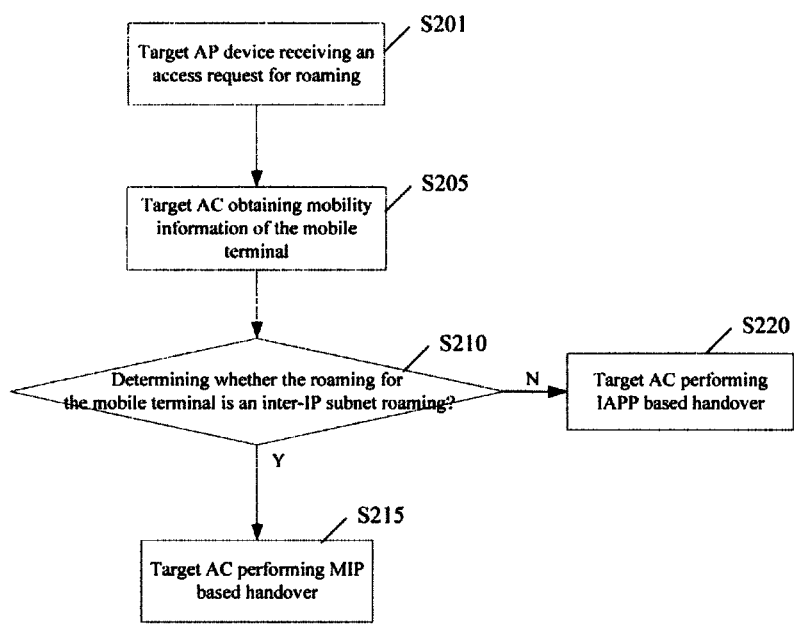
FIG. 2 is a flowchart of the roaming method for a mobile terminal in WLAN according to an embodiment of the present invention.

FIG. 2 shows a flowchart of the roaming method for a mobile terminal in WLAN according to an embodiment of the present invention. The present embodiment will be described in detail in conjunction with FIGS. 1 and 2.

In the present embodiment, the handover for the mobile terminal STA from the AP device WTP1 to the AP device WTP2a (first handover) in FIG. 1 will be mainly described as an example. In this case, the AP device WTP1 is the original AP device, and accordingly the AC1 is the original access controller AC, the ESS1 is the original ESS; the AP device WTP2 is the target AP device, and accordingly, the access controller AC21 is the target AC, the ESS2 is the target ESS.

As shown in FIG. 2, at step S201, the AP device WTP2a receives an access request for roaming sent by the mobile terminal STA. When the mobile terminal STA moves from the coverage area of the AP device WTP1 in the ESS1 into the coverage area of the AP device WTP2a in the ESS2 (corresponding to "101" in FIG. 1), it disconnects the Layer 2 connection with the AP device WTP1 (corresponding to "102" in FIG. 1), and sends to the AP device WTP2a a request for re-associating with the AP device WTP2*a* (corresponding to "103" in FIG. 1). For example, for 802.11 protocol, the request is REASSOCIATE.request message. When the AP device WTP2*a* receives the re-associating request, it performs the appropriate processing according to the type of the MAC model for the AP device WTP2*a*.

When the AP device WTP2*a* employs the local MAC model, that is, the AP device WTP2*a* performs all the processing in the MAC layer, first the AP device WTP2*a* extracts service set ID of the original AP device WTP1 for the mobile terminal STA and MAC address of the mobile terminal STA etc from the received re-associating request. Then the AP device WTP2*a* includes the service set ID of the original AP device WTP1 and the MAC address of the mobile terminal STA in a MOVE.request message in the IAPP protocol for example, and sends the message to the access controller AC21 (corresponding to "104" in FIG. 1). When the AP device WTP2*a* employs the split MAC model, that is, the AP device WTP2*a* is only used to send and receive the wireless traffic. The received re-associating request is directly forwarded to the access controller AC21. FIG. 1 only shows the case in which the AP device WTP2*a* employs the local MAC model.

At step S205, the access controller AC21 obtains the mobility information of the mobile terminal STA in the original ESS1 based on the received request. In this embodiment, the mobility information includes information of the AP device, the access controller and the mobile agent server associated with the mobile terminal. The mobility information may be stored on an authentication server in the ESS and can be indexed by the MAC address of the mobile terminal. Specifically, the mobility information may comprise: the MAC address of the mobile terminal; the MAC address and IP address of the associated AP device; the MAC address and IP address of the associated access controller; the IP address of a home agent server; and the IP address of the associated foreign agent server.

When the mobile terminal accesses a certain AP device in the ESS for the first time, after an authentication server in the ESS authenticates the mobile terminal, the access controller AC to which the AP device belongs will generate the mobility information of the mobile terminal and send it to the authentication server for storage for future roaming and handover.

For example, the access controller AC may encapsulate the mobility information into an EAP message as extended attribute for transmission, the mobility information attribute in the extended EAP message is as follows:

Of course, those skilled in the art can understand that the mobility information may also be encapsulated into other messages for transmission.

In the present embodiment, first, the access controller AC21 extracts the service set ID of the AP device WTP1 and the MAC address of the mobile terminal STA from the received request (i.e., the request processed by the AP device WTP2*a* or the re-associating request directly forwarded by the AP device WTP2*a*).

Next, the access controller AC21 requests from a local authentication server AAAL, i.e., the authentication server in ESS2 for authentication of the mobile terminal STA and transmission of the mobility information of the mobile terminal STA based on the extracted service set ID of the AP device WTP1 and the MAC address of the mobile terminal STA (corresponding to "105" in FIG. 1).

Specifically, the access controller AC21 may include the service set ID of the AP device WTP1 and the MAC address of the mobile terminal STA into an ACCESS-REQUEST request in the LAPP protocol for example, and send it to the local authentication server AAAL.

The local authentication server AAAL, after receiving the request, authenticates the mobile terminal STA based on the MAC address of the mobile terminal STA. In the present embodiment, the authentication server is an Authentication, Authorization, Accounting (AAA) server, which authenticates the mobile terminal STA based on the Extensible Authentication Protocol (EAP). Those skilled in the art can readily appreciate that other authentication protocols such as Remote Authentication Dial in User Service (RADIUS) protocol may also be used.

On the other hand, the local authentication server AAAL also retrieves the mobility information of the mobile terminal STA in the ESS1 based on the MAC address of the mobile terminal STA. Here, the mobility information of the mobile terminal STA in the ESS1 comprises: the MAC address of the mobile terminal STA; the MAC address and IP address of the AP device WTP1; the MAC address and IP address of the access controller AC1; the IP address of a home agent HA server; and the IP address of the foreign agent server FA1. For the foreign agent server, it may be a standalone device or be integrated into an access controller. FIG. 1 shows the case where the foreign agent server is integrated into the access controller. The local authentication server AAAL first locally searches for the mobility information of the mobile terminal STA. Since the mobility information of the mobile terminal

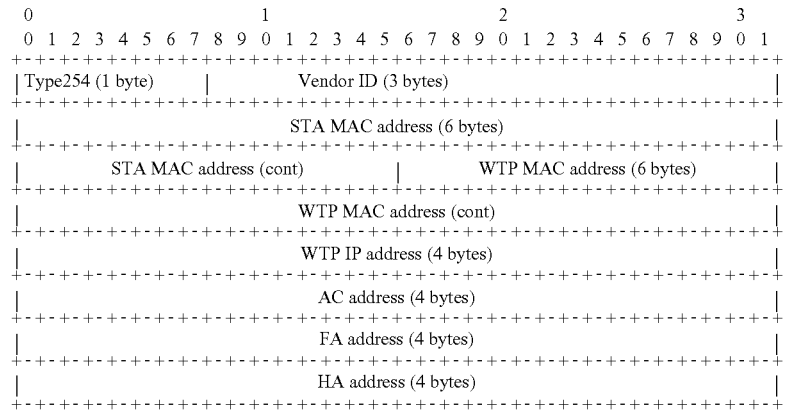

STA in the ESS1 is stored on the authentication server in the ESS1, the local authentication server AAAL cannot locally find the mobility information of the mobile terminal STA. So the local authentication server AAAL queries the authentication server in the ESS1 for the mobility information of the mobile terminal STA based on the service set ID of the AP device WTP1 and the MAC address of the mobile terminal STA (corresponding to "106" in FIG. 1), and receive the mobility information of the mobile terminal STA from the authentication server (corresponding to "107" in FIG. 1). Then the local authentication server AAAL provides the received mobility information of the mobile terminal STA along with authentication information to the access controller AC21 (corresponding to "108" in FIG. 1). Thus, the access controller AC21 receives the authentication information and the mobility information of the mobile terminal STA from the local authentication server AAAL. In addition, the authentication server in the ESS1 may delete the mobility information of the mobile terminal STA after the mobility information has been provided to the local authentication server AAAL.

Then, at step S210, the access controller AC21 determines whether the roaming for the mobile terminal STA is the inter-IP subnet roaming or the intra-IP subnet roaming based on the mobility information obtained at step S205. In the present embodiment, the access controller AC 21 compares whether the IP address of the AP device WTP1 and the IP address of the AP device WTP2a belong to the same network segment based on the obtained mobility information of the mobile terminal STA. When both of the IP addresses belong to the same network segment, the roaming for the mobile terminal STA is determined as the intra-IP subnet roaming. When both of the IP addresses do not belong to the same network segment, the roaming for the mobile terminal STA is determined as the inter-IP subnet roaming. For the first handover, the IP addresses of the AP device WTP1 and the AP device WTP2a do not belong to the same network segment, so the access controller AC21 can determine that the roaming for the mobile terminal STA from the AP device WTP1 to the AP device WTP2a is the inter-IP subnet roaming.

Then, the access controller AC21 performs the mobile IP (MIP) based handover (step S215). In the present embodiment, the foreign agent server FA21 in the AC21 triggers a standard mobile IP process, that is, registers the IP address of the target foreign agent server FA21 with the home agent server HA and requests from the home agent server HA for updating binding. The home agent server HA updates the binding of the IP address of the original foreign agent server FA1 and the mobile terminal STA as the binding of the IP address of the foreign agent server FA21 and the mobile terminal STA. Furthermore, the access controller AC21 establishes a data forwarding tunnel between the foreign agent server FA21 and the home agent server HA (corresponding to "109" in FIG. 1). Thus, the home agent server HA can send the data sent to the mobile terminal STA to the foreign agent server FA21 through the data forwarding tunnel. Then context information related to the mobile terminal STA is transmitted between the target foreign agent server FA21 and the foreign agent server FA1 (corresponding to "110" in FIG. 1), which can be implemented by an IAPP message. The context information related to the mobile terminal STA can comprise the data related to the service being used by the mobile terminal STA, the user profile, the security information such as data session key etc. The access controller AC21 reconstructs user environment for the mobile terminal STA based on these context information, and informs the AP device WTP2a that the handover completed using MOVE.response message in the IAPP protocol, for example (corresponding to in FIG. 1).

Further, after the mobile terminal STA is handed over to the AP device WTP2a, the access controller AC21 generates the mobility information of the mobile terminal STA in the ESS2 and transmits the generated mobility information to the local authentication server AAAL for storage.

The following describes the second handover. For the second handover, the original AP device is changed to the AP device WTP2a, the original access controller AC is changed to the access controller AC21, the target AP device is changed to the AP device WTP2b, the target access controller AC is changed to AC22, and both original ESS and target ESS are changed to the ESS2.

When the mobile terminal STA enters into the coverage area of the AP device WTP2b, it disconnects the Layer 2 connection with the AP device WTP2a and sends a re-associating request to the AP device WTP2b. After the AP device WTP2b receives the re-associating request (step S201), it extracts the service set ID of the AP device WTP2a and the MAC address of the mobile terminal STA from the request, and encapsulates them into MOVE.request message in the IAPP protocol for sending to the access controller AC22, or directly forwards the re-associating request to the access controller AC22. The access controller AC22 obtains the mobility information of the mobile terminal STA in the ESS2 from the local authentication server AAAL based on the received request (step S205). Since the mobility information of the mobile terminal STA in the ESS2 has already been stored on the local authentication server AAAL, the local authentication server AAAL locally finds the mobility information of the mobile terminal STA and returns the mobility information along with the authentication information back to the access controller AC22. Here, the mobility information of the mobile terminal STA comprises: the MAC address of the mobile terminal STA; the MAC address and IP address of the AP device WTP2a; the MAC address and IP address of the access controller AC21; the IP address of the home agent server HA; and the IP address of the foreign agent server FA21.

The access controller AC22 compares the IP address of the AP device WTP2a with the IP address of the AP device WTP2b (step S210) and finds that they belong to the same network segment. So the access controller AC22 determines that the roaming for the mobile terminal STA is the intra-IP subnet roaming. Then, the access controller AC22 performs the IAPP protocol based handover (step S220).

At step S220, first, the access controller AC22 compares the IP address of the original access controller and the IP address of the target access controller to determine whether the original access controller and the target access controller are the same access controller. During the second handover, the original access controller is the access controller AC21, the target access controller is the access controller AC22. So the original access controller and the target access controller are different access controllers. In this case, the access controller AC22 receives from the access controller AC21 the context information relating to the mobile terminal STA, which may be implemented by an IAPP message. Then, the access controller AC22 reconstructs the user environment for the mobile terminal STA based on the received context information and informs the AP device WTP2b that the handover is completed.

Further, after the mobile terminal STA is handed over to the AP device WTP2b, the access controller AC22 generates new mobility information of the mobile terminal STA in the ESS2 and transmits the generated new mobility information to the local authentication server AAAL for storage.

The third handover will be described below. During the third handover, the original AP device is changed to the AP device WTP2b, the target AP device is changed to the AP device WTP2c, and both the original access controller and the target access controller are the access controller AC22, and both the original ESS and the target ESS are the ESS2.

When the mobile terminal STA enters into the coverage area of the AP device WTP2c, similar to the previous handovers, it disconnects the Layer 2 connection with the AP device WTP2b and sends a re-associating request to the AP device WTP2c. After the AP device WTP2c receives the re-associating request (step S201), it extracts the service set ID BSSID of the AP device WTP2b and the MAC address of the mobile terminal STA from the request, and encapsulates them into the MOVE.request message of the IAPP protocol for transmission to the access controller AC22 or directly forwards the re-associating request to the access controller AC22. The access controller AC22 obtains the mobility information of the mobile terminal STA in the ESS2 from the local authentication server AAAL based on the received request (step S205). Since the mobility information of the mobile terminal STA in the ESS2 has already been stored on the local authentication server AAAL, the local authentication server AAAL locally finds the mobility information of the mobile terminal STA and returns the mobility information along with the authentication information back to the access controller AC22. Here, the mobility information of the mobile terminal STA comprises: the MAC address of the mobile terminal STA; the MAC address and IP address of the AP device WTP2b; the MAC address and IP address of the access controller AC22; the IP address of the home agent server HA; and the IP address of the foreign agent server FA22.

The access controller AC22 compares the IP address of the AP device WTP2b with the IP address of the AP device WTP2c (step S210) and finds that the two IP addresses belong to the same network segment. So the access controller AC22 determines that the roaming for the mobile terminal STA is the intra-IP subnet roaming. Then, the access controller AC22 performs the IAPP protocol based handover (step S220).

At step S220, first, the access controller AC22 compares the IP address of the original access controller and the IP address of the target access controller to determine whether the original access controller and the target access controller are the same access controller. During the third handover, both the original access controller and the target access controller are the access controller AC22. Therefore, they are the same access controller. In this case, the access controller AC22 has already known the context information for the mobile terminal STA, and it is not necessary to reconstruct the user environment for the mobile terminal STA. So the access controller AC22 directly informs the AP device WTP2c that the handover is completed.

Further, after the mobile terminal STA is handed over to the AP device WTP2c, the access controller AC22 generates the new mobility information of the mobile terminal STA in the ESS2 and transmits the generated new mobility information to the local authentication server AAAL for storage.

It can be seen from the above description that the roaming method for a mobile terminal in WLAN of the present embodiment can realize the global roaming for the mobile terminal in the WLAN, enable the mobile terminal to use the fixed IP address to implement the inter-IP subnet roaming, provide the efficient interworking mechanism for the MIP protocol and the IAPP protocol, and solves the problem caused by the application of the mobile IP technology in the WLAN with the centralized network architecture.

Figure 3:
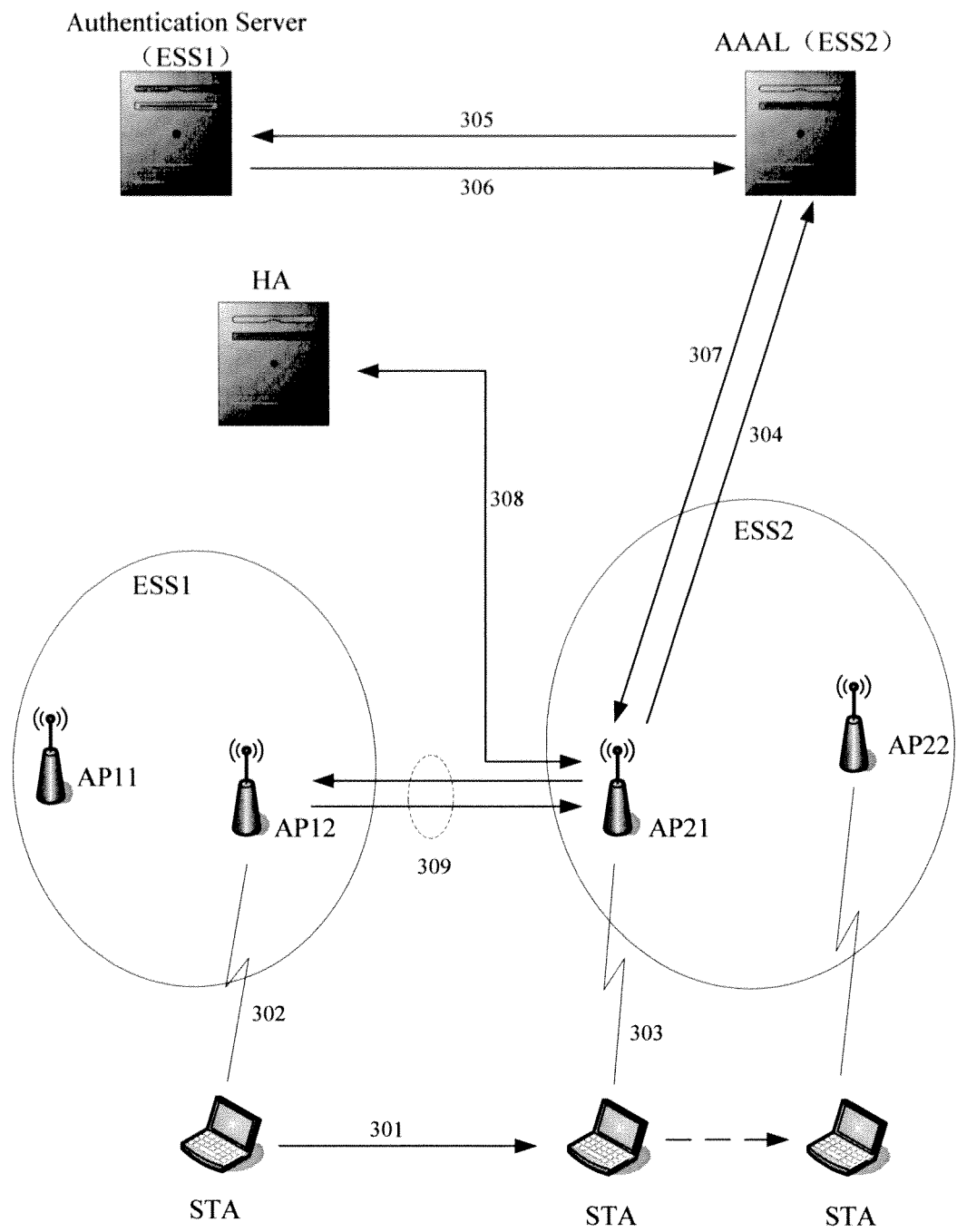
FIG. 3 is a structural diagram of the wireless local area network in which the roaming method for a mobile terminal in the WLAN according to another embodiment of the present invention can be implemented.

FIG. 3 shows a structural diagram of the WLAN in which the roaming method for the mobile terminal in the WLAN according to another embodiment of the present invention can be implemented, wherein the WLAN employs the autonomous network architecture. As shown in FIG. 3, the WLAN includes a plurality of ESSes (for the sake of simplicity, only two ESSes (ESS1 and ESS2) are shown). The ESS1 includes two access point devices AP11 and AP12, the ESS2 includes two access point devices AP21 and AP22. Initially, the mobile terminal STA is within the coverage area of the ESS1 and accesses the WLAN via the AP device AP12. Then, the mobile terminal STA starts to move. When the mobile terminal STA moves into the coverage area of the AP device AP21 in the ESS2, the handover for the mobile terminal STA from the AP device AP11 to the AP device AP21 occurs (first handover). When the mobile terminal STA continues to move into the coverage area of the AP device AP22, the handover for the mobile terminal STA from the AP device AP21 to the AP device AP22 occurs (second handover). Each of the above handovers may be executed by means of the roaming method for a mobile terminal in a wireless local area network described below with reference to FIG. 4.

Figure 4:
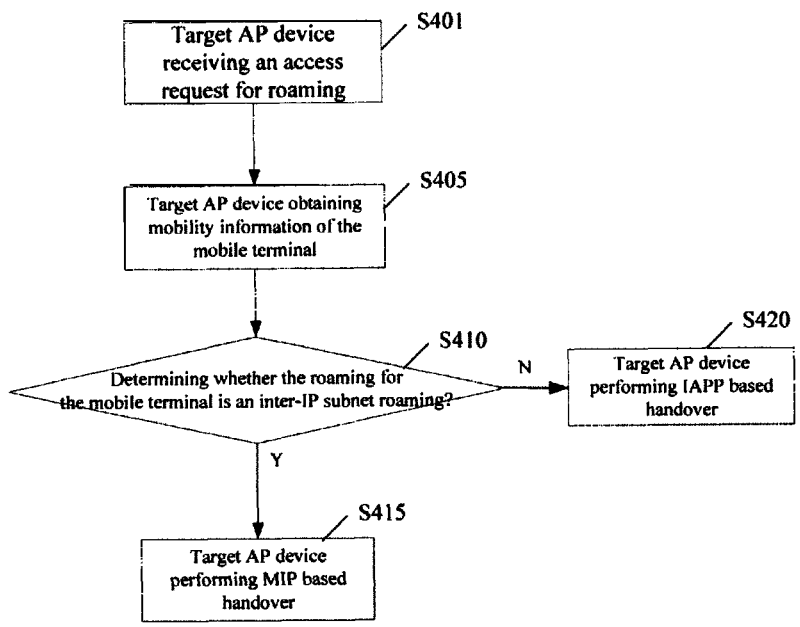
FIG. 4 is a flowchart of the roaming method for a mobile terminal in WLAN according to another embodiment of the present invention.

FIG. 4 shows a flowchart of the roaming method for a mobile terminal in WLAN according to another embodiment of the present invention. The present embodiment will be described in detail in conjunction with FIGS. 3 and 4. For those same parts as the previous embodiments, their description will be properly omitted.

In the present embodiment, as an example, the handover for the mobile terminal STA from the AP device AP12 to the AP device AP21 (first handover) in FIG. 3 will be described. In this case, the AP device AP12 is the original AP device, the ESS1 is the original ESS; the AP device AP21 is the target AP device, and the ESS2 is the target ESS.

As shown in FIG. 4, at step S401, the AP device AP21 receives the access request for roaming sent by the mobile terminal STA. When the mobile terminal STA moves from the coverage area of the AP device AP12 in the ESS1 into the coverage area of the AP device AP21 in the ESS2 (corresponding to "301" in FIG. 3), it disconnects the Layer 2 connection with the AP device AP12 (corresponding to "302" in FIG. 3), and sends to the AP device AP21 the request for re-associating with the AP device AP21 (corresponding to "303" in FIG. 3), for example, the request is the REASSOCIATE.request message in 802.11 protocol.

Next, at step S405, the AP device AP21 obtains the mobility information of the mobile terminal STA in the original ESS1 based on the received request. In this embodiment, the mobility information includes the information of the access point device and the mobile agent server associated with the mobile terminal. Specifically, the mobility information comprises: the MAC address of the mobile terminal; the MAC address and IP address of the associated AP device; the IP address of the home agent server; and the IP address of the associated foreign agent server. Generally, the mobility information is stored on the authentication server in the extended service set and can be indexed by the MAC address of the mobile terminal.

In the present embodiment, first, the AP device AP21 extracts the service set ID of the AP device AP12 and the MAC address of the mobile terminal STA from the received request.

Next, the AP device AP21 requests from the local authentication server AAAL (i.e., the authentication server in the ESS2) for authentication of the mobile terminal STA and transmission of the mobility information of the mobile terminal STA based on the extracted service set ID BSSID of the AP device AP12 and the MAC address of the mobile terminal STA (corresponding to "304" in FIG. 3).

Specifically, the AP device AP21 may include the service set ID BSSID of the AP device AP12 and the MAC address of the mobile terminal STA in the ACCESS-REQUEST request in the IAPP protocol for example, and send it to the local authentication server AAAL.

After the local authentication server AAAL receives the request, it authenticates the mobile terminal STA based on the MAC address of the mobile terminal STA. In the present embodiment, the authentication server is the AAA server, which authenticates the mobile terminal STA based on EAP. Those skilled in the art can readily appreciate that other authentication protocols such as RADIUS protocol may also be used.

On the other hand, the local authentication server AAAL also retrieves the mobility information of the mobile terminal STA in the ESS1 based on the MAC address of the mobile terminal STA. Here, the mobility information of the mobile terminal STA in the ESS1 comprises: the MAC address of the mobile terminal STA; the MAC address and IP address of the AP device AP12; the IP address of the home agent server HA; and the IP address of the foreign agent server FA12. The foreign agent server can be a standalone device or be integrated into the AP device. FIG. 3 shows the case where the foreign agent server is integrated into the AP device. The local authentication server AAAL first locally searches for the mobility information of the mobile terminal STA. Since the mobility information of the mobile terminal STA in the ESS1 is stored on the authentication server in the ESS1, the local authentication server AAAL cannot locally find the mobility information of the mobile terminal STA. The local authentication server AAAL queries the authentication server in the ESS1 for the mobility information of the mobile terminal STA based on the service set ID BSSID of the AP device AP12 and the MAC address of the mobile terminal STA (corresponding to "305" in FIG. 3), and receives the mobility information of the mobile terminal STA from the authentication server (corresponding to "306" in FIG. 3), and then provides the received mobility information of the mobile terminal STA along with the authentication information to the AP device AP21 (corresponding to "307" in FIG. 3). Thus, the AP device AP21 receives the authentication information and the mobility information of the mobile terminal STA from the local authentication server AAAL.

Then, at step S410, the AP device AP21 determines whether the roaming for the mobile terminal STA is the inter-IP subnet roaming or the intra-IP subnet roaming based on the mobility information obtained at step S405. In the present embodiment, the AP device AP21 compares whether the IP address of the AP device AP12 and the IP address of the AP device AP21 belong to the same network segment, and determines the roaming for the mobile terminal STA as the intra-IP subnet roaming if the IP addresses belong to the same network segment, and determines the roaming for the mobile terminal STA as the inter-IP subnet roaming if the IP addresses do not belong to the same network segment. For the first handover, the IP addresses of the AP device AP12 and the AP device AP21 do not belong to the same network segment. So the AP device AP21 determines that roaming for the mobile terminal STA from the AP device AP12 to the AP device AP21 is the inter-IP subnet roaming.

Then the AP device AP21 performs the mobile IP based handover (step S415). In the present embodiment, the AP device AP21 registers the IP address of the target foreign agent server FA21 with the home agent server HA and requests the home agent server HA to update the binding. The home agent server HA updates the binding of the IP address of the original foreign agent server FA12 and the mobile terminal STA as the binding of the IP address of the foreign agent server FA21 and the mobile terminal STA. Furthermore, the AP device AP21 establishes a data forwarding tunnel between the foreign agent server FA21 and the home agent server HA (corresponding to "308" in FIG. 3). Thus, the home agent server HA can send the data sent to the mobile terminal STA to the foreign agent server FA21 through the data forwarding tunnel. Then, the context information related to the mobile terminal STA is transferred between the target foreign agent server FA21 and the original foreign agent server FA12 (corresponding to "309" in FIG. 3), which may be implemented by the IAPP message. As mentioned above, the context information related to the mobile terminal STA may comprise the data related to the service being used by the mobile terminal STA, the user profile, the security information such as the data session key etc. The AP device AP21 reconstructs the user environment for the mobile terminal STA based on these context information, thereby completing the handover.

Further, after the mobile terminal STA is handed over to the AP device AP21, the AP device AP21 generates the mobility information of the mobile terminal STA in the ESS2 and transmits the generated mobility information to the local authentication server AAAL for storage.

The second handover process will be described below. For the second handover, the original access point device is changed to the AP device AP21, the target access point device is changed to the AP device AP22, and both the original ESS and the target ESS are changed to the ESS2.

When the mobile terminal STA enters into the coverage area of the AP device AP22, it disconnects the Layer 2 connection with the AP device AP21 and sends the re-associating request to the AP device AP22. The request contains the service set ID BSSID of the AP device AP21 and the MAC address of the mobile terminal STA. After the AP device AP22 receives the re-associating request (step S401), it obtains the mobility information of the mobile terminal STA in the ESS2 from the local authentication server AAAL (step S405). Since the mobility information of the mobile terminal STA in the ESS2 has already been stored on the local authentication server AAAL, the local authentication server AAAL locally finds the mobility information of the mobile terminal STA and returns the mobility information along with the authentication information back to the AP device AP22. Here, the mobility information of the mobile terminal STA comprises: the MAC address of the mobile terminal STA; the MAC address and IP address of the AP device AP21; the IP address of the home agent server HA; and the IP address of the foreign agent server FA21.

The AP device AP22 compares the IP address of the AP device AP21 and the IP address of the AP device AP22, and finds that the two IP addresses belong to the same network segment. So the AP22 determines that the roaming for the mobile terminal STA is the intra-IP subnet roaming (step S410). Then, the AP device AP22 performs the IAPP protocol based handover (step S420).

In step S420, first, the AP device AP22 receives from the AP device AP21 the context information relating to the mobile terminal STA, which can be implemented by the IAPP message. Then, the AP device AP22 reconstructs the user environment for the mobile terminal STA based on the received context information, thereby completing the handover.

Further, after the mobile terminal STA is handed over to the AP device AP22, the AP device AP22 generates new mobility information of the mobile terminal STA in the ESS2 and transmits the generated new mobility information to the local authentication server AAAL for storage.

It should be noted that the mobile terminal can be any type of wireless access enabled terminal device, such as the portable computer, the mobile phone, the personal digital assistant (PDA), etc.

Figure 5:
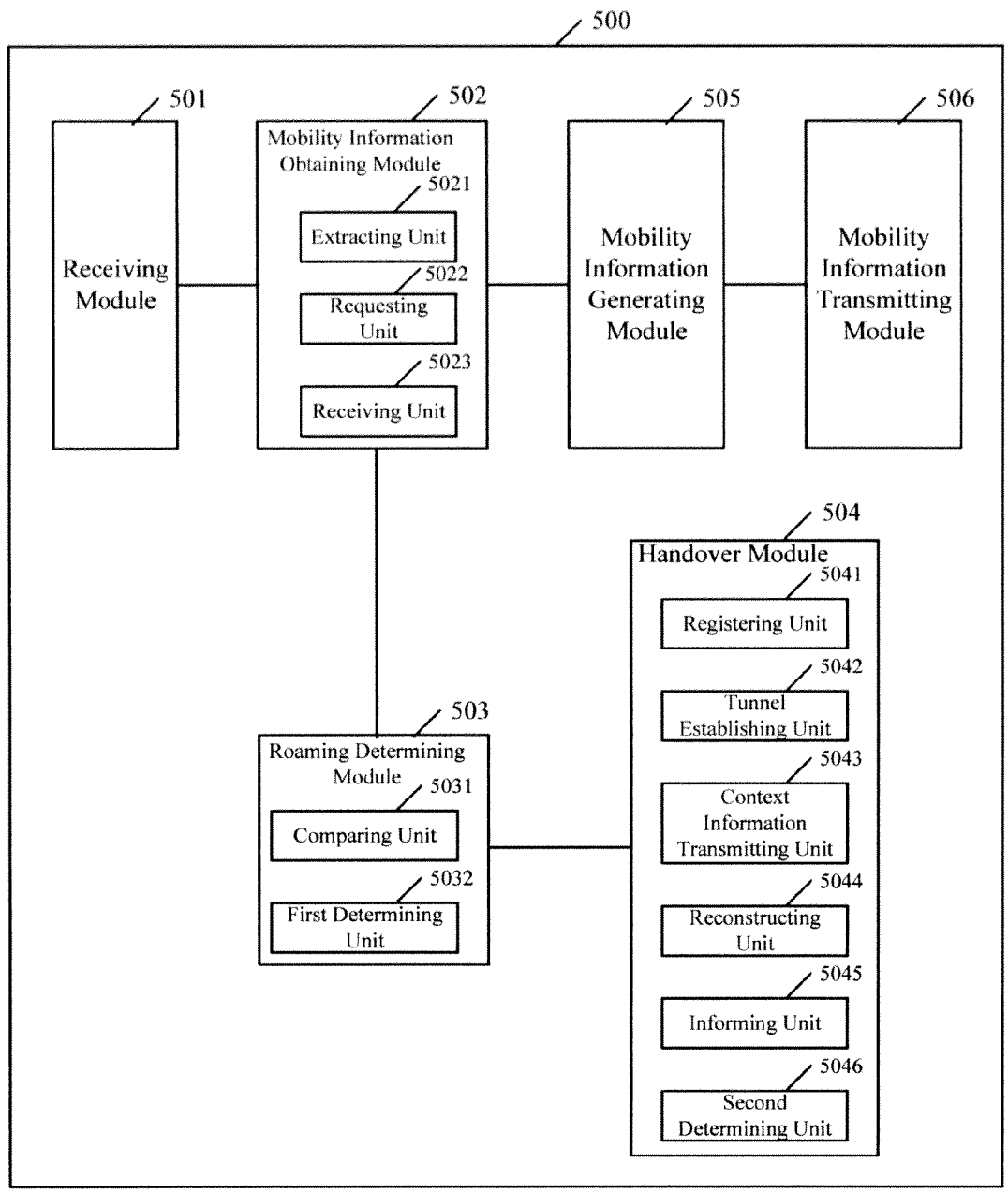
FIG. 5 is a schematic block diagram of the access controller according to an embodiment of the present invention.

FIG. 5 shows a schematic block diagram of the access controller 500 according to an embodiment of the present invention. The present embodiment will be described in detail in conjunction with the drawings, wherein for those same parts as the previous embodiments, their description will be properly omitted.

As shown in FIG. 5, the access controller 500 of the present embodiment comprises: a receiving module 501 which receives a request for roaming for a mobile terminal from an access point device; a mobility information obtaining module 502 which obtains mobility information of the mobile terminal in an original ESS based on the request; a roaming determining module 503 which determines whether the roaming for the mobile terminal is an inter-IP subnet roaming or an intra-IP subnet roaming based on the obtained mobility information; and a handover module 504 which performs the mobile IP based handover when the roaming is determined by the roaming determining module 503 as the inter-IP subnet roaming and performs the IAPP based handover when the roaming is determined by the roaming determining module 503 as the intra-IP subnet roaming.

In the access controller 500, the receiving module 501 receives the request relating to the roaming for the mobile terminal from the AP device it controls, such as REASSOCIATE.request or MOVE.request request. Then, the mobility information obtaining module 502 obtains the mobility information of the mobile terminal in the original ESS, wherein the mobility information includes the information of the AP device, the access controller and the mobile agent server associated with the mobile terminal. Specifically, the mobility information comprises: the MAC address of the mobile terminal; the MAC address and IP address of the associated AP device; the MAC address and IP address of the associated access controller; the IP address of the home agent server; and the IP address of the associated foreign agent server.

In the mobility information obtaining module 502, an extracting unit 5021 extracts the service set ID BSSID of the original access point device for the mobile terminal and the MAC address of the mobile terminal and the like from the request received by the receiving module 501. Then a requesting unit 5022 requests from the local authentication server for authentication of the mobile terminal and transmission of the mobility information of the mobile terminal based on the extracted service set ID of the original access point device and the MAC address of the mobile terminal. A receiving unit 5023 receives the authentication information and the mobility information of the mobile terminal from the local authentication server and provides them to the roaming determining module 503. Here, the mobility information of the mobile terminal comprises: the MAC address of the mobile terminal; the MAC address and IP address of the original access point device; the MAC address and IP address of the original access controller; the IP address of the home agent server; and the IP address of the original foreign agent server.

In the roaming determining module 503, a comparing unit 5031 compares whether the IP address of the original access point device and the IP address of the access point device currently receiving the re-associating request from the mobile terminal belong to the same network segment. A first determining unit 5032 determines the roaming for the mobile terminal as the intra-IP subnet roaming if the comparison result of the comparing unit 5031 is that the two IP addresses belong to the same network segment. The first determining unit 5032 determines the roaming for the mobile terminal as the inter-IP subnet roaming if the comparison result of the comparing unit 5031 is that the two IP addresses do not belong to the same network segment.

Then, the handover module 504 performs the corresponding handover based on the result of the roaming determining module 503. The handover module 504 performs the MIP based handover when the roaming determining module 503 determines that the roaming is inter-IP subnet roaming. Here, in the handover module 504, a registering unit 5041 registers the IP address of the target foreign agent server with the home agent server and requests the home agent server to update the binding. A tunnel establishing unit 5042 establishes a data forwarding tunnel between the target foreign agent server and the home agent server. Then a context information transmitting unit 5043 transmits the context information relating to the mobile terminal between the target foreign agent server and the original foreign agent server for the mobile terminal. A reconstructing unit 5044 reconstructs the user environment for the mobile terminal based on the context information. After the user environment for the mobile terminal has been reconstructed in the access controller 500, an informing unit 5045 informs the current access point device that the handover is completed.

The handover module 504 performs the IAPP protocol based handover when the roaming determining module 503 determines that the roaming is the intra-IP subnet roaming. Here, in the handover module 504, first, a second determining unit 5046 determines whether the original access controller for the mobile terminal and the access controller 500 are the same access controller by comparing the IP addresses of the two access controllers. When the second determining unit 5046 determines that the two access controllers are different access controllers, the context information transmitting unit 5043 receives the context information relating to the mobile terminal from the original access controller. Then the reconstructing unit 5044 reconstructs the user environment for the mobile terminal, and the informing unit 5045 informs the current access point device that the handover is completed.

Further, the access controller 500 may comprises: a mobility information generating module 505 which generates the mobility information of the mobile terminal in the current ESS; and a mobility information transmitting module 506 which transmits the generated mobility information to the local authentication server for storage. For example, the mobility information transmitting module 506 transmits the mobility information by means of the EAP message.

It should be noted that the access controller 500 of the present embodiment is operable to implement the roaming method for the mobile terminal in WLAN shown in FIG. 2.

Figure 6:
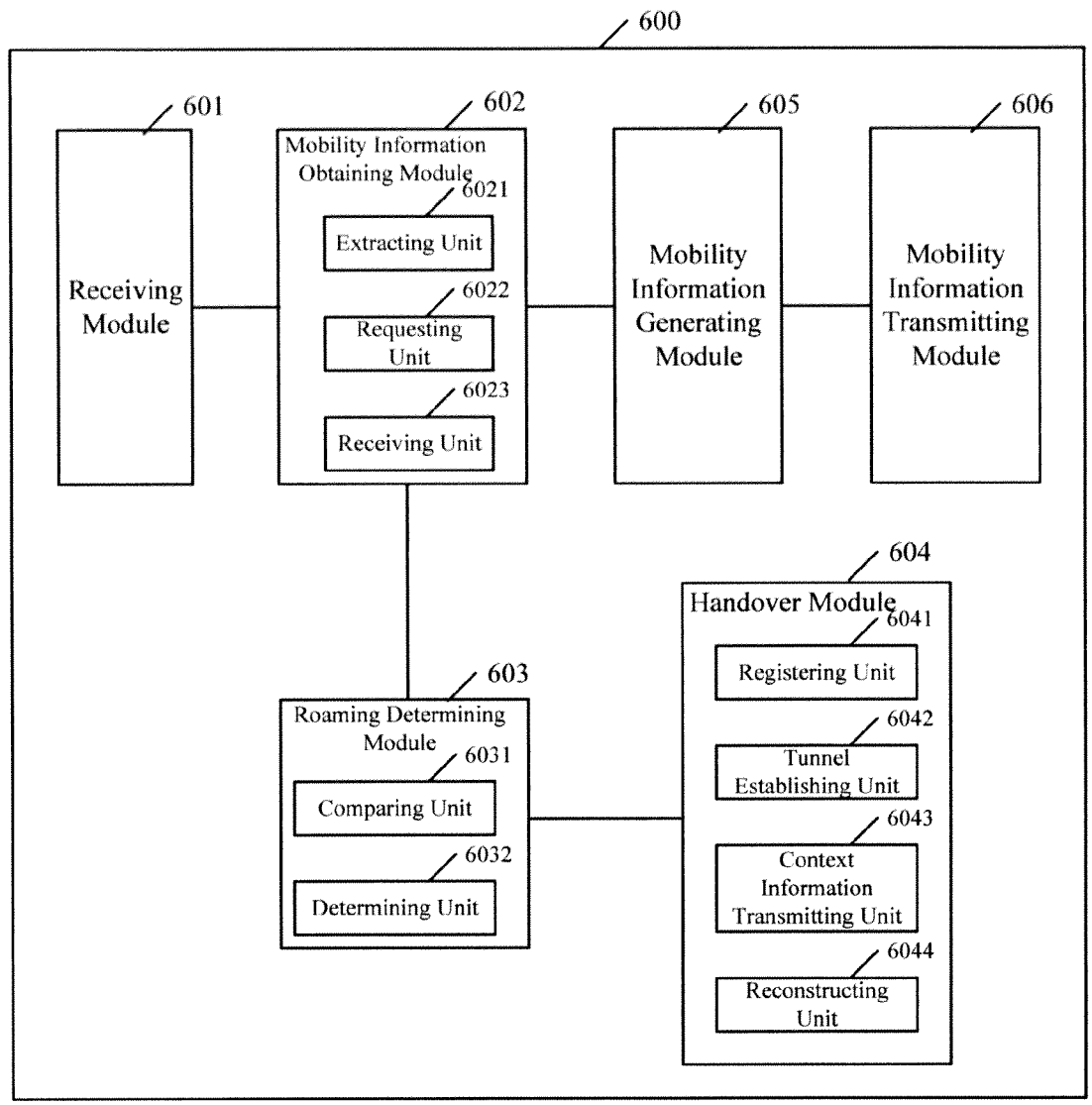
FIG. 6 is a schematic block diagram of the access point device according to an embodiment of the present invention.

FIG. 6 is a schematic block diagram of the access point device 600 according to an embodiment of the present invention. The present embodiment will be described in detail in conjunction with the drawing, wherein for those same parts as the previous embodiments, their description will be properly omitted.

As shown in FIG. 6, the access point device 600 of the present embodiment comprises: a receiving module 601 which receives an access request for roaming from the mobile terminal; a mobility information obtaining module 602 which obtains the mobility information of the mobile terminal in the original ESS based on the received access request; a roaming determining module 603 which determines whether the roaming for the mobile terminal is an inter-IP subnet roaming or an intra-IP subnet roaming based on the obtained mobility information; and a handover module 604 which performs the mobile IP based handover when the roaming is determined by the roaming determining module 603 as the inter-IP subnet roaming and performs the IAPP based handover when the roaming is determined by the roaming determining module 603 as the intra-IP subnet roaming.

In the access point device 600, the receiving module 601 receives the access request relating to the roaming sent by the mobile terminal, such as REASSOCIATE.request in 802.11 protocol. Then, the mobility information obtaining module 602 obtains the mobility information of the mobile terminal in the original ESS based on the access request. In the present embodiment, the mobility information includes the information of the access point device and the mobile agent server associated with the mobile terminal. Specifically, the mobility information comprises: the MAC address of the mobile terminal; the MAC address and IP address of the associated access point device; the IP address of the home agent server; and the IP address of the associated foreign agent server.

In the mobility information obtaining module 602, first, an extracting unit 6021 extracts the service set ID (BSSID) of the original access point device for the mobile terminal and the MAC address of the mobile terminal and the like from the received request. A requesting unit 6022 requests from the local authentication server for authentication of the mobile terminal and transmission of the mobility information of the mobile terminal based on the service set ID of the original access point device and the MAC address of the mobile terminal extracted by the extracting unit 6021. A receiving unit 6023 receives the authentication information and the mobility information of the mobile terminal from the local authentication server.

The mobility information obtaining module 602 provides the obtained mobility information of the mobile terminal to the roaming determining module 603 to determine whether the roaming for the mobile terminal is the inter-IP subnet roaming or the intra-IP subnet roaming. In the roaming determining module 603, a comparing unit 6031 compares whether the IP address of the original access point device for the mobile terminal and the IP address of the access point device 600 belong to the same network segment. A determining unit 6032 determines the roaming for the mobile terminal as the intra-IP subnet roaming when the comparison result of the comparing unit 6031 is that the two IP addresses belong to the same network segment. The determining unit 6032 determines the roaming for the mobile terminal as the inter-IP subnet roaming when the comparison result of the comparing unit 6031 is that the two IP addresses do not belong to the same network segment.

Then, the handover module 604 performs the corresponding handover based on the result of the roaming determining module 603. The handover module 604 performs the MIP based handover when the roaming determining module 603 determines that the roaming is the inter-IP subnet roaming. In this case, in the handover module 604, a registering unit 6041 registers the IP address of the target foreign agent server with the home agent server and requests the home agent server to update the binding. A tunnel establishing unit 6042 establishes a data forwarding tunnel between the target foreign agent server and the home agent server. Meanwhile, a context information transmitting unit 6043 transmits the context information relating to the mobile terminal between the target foreign agent server and the original foreign agent server for the mobile terminal. A reconstructing unit 6044 reconstructs the user environment for the mobile terminal based on the context information.

The handover module 604 performs the IAPP protocol based handover when the roaming determining module 603 determines that the roaming is the intra-IP subnet roaming. In this case, in the handover module 604, the context information transmitting unit 6043 receives the context information relating to the mobile terminal from the original access point device for the mobile terminal, and provides the context information to the reconstructing unit 6044 to reconstruct the user environment for the mobile terminal.

Further, the access point device 600 of the present embodiment may comprises: a mobility information generating module 605 which generates the mobility information of the mobile terminal in the current ESS; and a mobility information transmitting module 606 which transmits the generated mobility information to the local authentication server for storage. For example, the mobility information transmitting module 606 can transmit the mobility information by means of the EAP message.

It should be noted that the access point device 600 of the present embodiment is operable to implement the roaming method for the mobile terminal in WLAN shown in FIG. 4.

It should be noted that the access controller, access point device of the above embodiments and their respective components may be implemented by hardware circuits such as Large Scale Integrated circuit or gate arrays, semiconductors such as logic chip or transistors, or programmable hardware devices such as field programmable gate array, programmable logic device etc, or can be implemented by software executed by various types of processors, or can be implemented by the combination of the above hardware circuit and software.

Although the roaming method for the mobile terminal in WLAN and related access controller and access point device of the present invention have been described above through some exemplary embodiments, these embodiments are not exhaustive, and those skilled in the art can realize various changes and modifications within the spirit and scope of the invention. Therefore, the present invention is not limited to these embodiments, and the scope of the present invention is only defined by the appended claims.

The invention claimed is:

1. A roaming method for a mobile terminal in a wireless local area network including a plurality of extended service sets (ESSes), each of the plurality of ESSes including at least one access controller (AC) and at least two access point (AP) devices, wherein each access controller is operative to configure, control and manage at least one AP device, the roaming method comprising:

a target AP device receiving an access request for roaming from the mobile terminal;

a target AC to which the target AP device belongs obtaining mobility information of the mobile terminal in an original ESS based on the access request, wherein the mobility information includes information of an AP device, an AC and a mobile agent server associated with the mobile terminal;

the target AC determining whether the roaming for the mobile terminal is an inter-IP subnet roaming or an intra-IP subnet roaming based on the obtained mobility information;

the target AC performing mobile IP (MIP) based handover when the roaming is determined as the inter-IP subnet roaming; and the target AC performing Inter Access Point Protocol (IAPP) based handover when the roaming is determined as the intra-IP subnet roaming.

2. The method of claim 1, wherein the target AC to which the target AP device belongs obtaining mobility information of the mobile terminal in an original ESS comprises:
the target AC extracting service set identification (ID) of the original AP device and medium access control (MAC) address of the mobile terminal from the received request;
the target AC requesting from a local authentication server for authentication of the mobile terminal and transmission of the mobility information of the mobile terminal based on the extracted service set ID of the original AP device and the MAC address of the mobile terminal;
the local authentication server authenticating the mobile terminal and retrieving the mobility information of the mobile terminal; and
the target AC receiving authentication information and the mobility information from the local authentication server.

3. The method of claim 1, wherein the target AC performing mobile IP (MIP) based handover comprises:
registering IP address of a target foreign agent server with the home agent server and requesting for updating binding;
establishing a data forwarding tunnel between the target foreign agent server and the home agent server;
transmitting context information relating to the mobile terminal between the target foreign agent server and an original foreign agent server;
reconstructing user environment for the mobile terminal based on the context information; and
informing the target AP device that handover is completed.

4. The method of claim 1, wherein the target AC performing Inter Access Point Protocol (IAPP) based handover comprises:
determining whether an original AC and the target AC are the same AC;
if they are different ACs,
receiving context information relating to the mobile terminal from the original AC;
reconstructing user environment for the mobile terminal based on the context information; and
informing the target AP device that handover is completed; and
if they are the same AC, informing the target AP device that handover is completed.

5. A roaming method for a mobile terminal in a wireless local area network including a plurality of extended service sets (ESSes), each of the plurality of ESSes including at least two access point (AP) devices, the roaming method comprising:
a target AP device receiving an access request for roaming from the mobile terminal;
the target AP device obtaining mobility information of the mobile terminal in an original ESS based on the access request, wherein the mobility information include information of an AP device and a mobile agent server associated with the mobile terminal;
the target AP device determining whether the roaming for the mobile terminal is an inter-IP subnet roaming or an intra-IP subnet roaming based on the obtained mobility information;
the target AP device performing mobile IP (MIP) based handover when the roaming is determined as the inter-IP subnet roaming; and the target AP device performing Inter Access Point Protocol (IAPP) based handover when the roaming is determined as the intra-IP subnet roaming.

6. The method of claim 5, wherein the target AP device receiving an access request for roaming from the mobile terminal comprises:
receiving a request for re-associating with the target AP device from the mobile terminal.

7. The method of claim 5, wherein the target AP device obtaining mobility information of the mobile terminal in an original ESS comprises:
the target AP device extracting service set identification (ID) of an original AP device for the mobile terminal and medium access control (MAC) address of the mobile terminal from the received request;
the target AP device requesting from a local authentication server for authentication of the mobile terminal and transmission of the mobility information of the mobile terminal based on the extracted service set ID of the original AP device and the MAC address of the mobile terminal;
the local authentication server authenticating the mobile terminal and retrieving the mobility information of the mobile terminal; and
the target AP device receiving authentication information and the mobility information from the local authentication server.

8. The method of claim 5, wherein the target AP device performing mobile IP (MIP) based handover comprises:
registering IP address of a target foreign agent server with the home agent server and requesting for updating binding;
establishing a data forwarding tunnel between the target foreign agent server and the home agent server;
transmitting context information relating to the mobile terminal between the target foreign agent server and an original foreign agent server; and
reconstructing user environment for the mobile terminal based on the context information.

9. The method of claim 5, wherein the target AP device performing Inter Access Point Protocol (IAPP) based handover comprises:
receiving context information relating to the mobile terminal from the original AP device of the mobile terminal; and
reconstructing user environment for the mobile terminal based on the context information.

10. An access controller (AC) comprising:
a receiving module that receives a request for roaming for a mobile terminal from an access point (AP) device;
a mobility information obtaining module that obtains mobility information of the mobile terminal in an original extended service set (ESS) based on the request, wherein the mobility information include information of an AP device, an AC and a mobile agent server associated with the mobile terminal;
a roaming determining module that determines whether the roaming for the mobile terminal is an inter-IP subnet roaming or an intra-IP subnet roaming based on the obtained mobility information; and
a handover module that performs mobile IP (MIP) based handover when the roaming is determined as the inter-IP subnet roaming and performs Inter Access Point Protocol (IAPP) based handover when the roaming is determined as the intra-IP subnet roaming.

11. The access controller (AC) of claim 10, wherein the mobility information obtaining module comprises:

an extracting unit that extracts service set identification (ID) of an original AP device for the mobile terminal and medium access control (MAC) address of the mobile terminal from the received request;

a requesting unit that requests from a local authentication server for authentication of the mobile terminal and transmission of the mobility information of the mobile terminal based on the extracted service set ID of the original AP device and the MAC address of the mobile terminal; and a receiving unit that receives authentication information and the mobility information from the local authentication server.

12. The access controller of claim 10, wherein the handover module comprises:

a registering unit that registers IP address of a target foreign agent server with the home agent server and requests for updating binding when performing the MIP based handover;

a tunnel establishing unit that establishes a data forwarding tunnel between the target foreign agent server and the home agent server when performing the MIP based handover;

a second determining unit that determines whether an original AC for the mobile terminal and the AC are the same AC when performing the IAPP based handover;

a context information transmitting unit that transmits MIP based handover associated context information relating to the mobile terminal between the target foreign agent server and an original foreign agent server for the mobile terminal when performing the MIP based handover, and receives IAPP based handover associated context information relating to the mobile terminal from the original AC if the second determining unit determines that the original AC and the AC are different ACs when performing the IAPP based handover;

a reconstructing unit that reconstructs user environment for the mobile terminal based on at least one of the MIP based handover and the IAPP based handover associated context information; and an informing unit that informs the target AP device that handover is completed.

13. An access point (AP) device comprising:

a receiving module that receives an access request for roaming from a mobile terminal;

a mobility information obtaining module that obtains mobility information of the mobile terminal in an original extended service set (ESS) based on the request, wherein the mobility information include information of an AP device and a mobile agent server associated with the mobile terminal;

a roaming determining module that determines whether the roaming for the mobile terminal is an inter-IP subnet roaming or an intra-IP subnet roaming based on the obtained mobility information; and a handover module that performs mobile IP (MIP) based handover when the roaming is determined as the inter-IP subnet roaming and Inter Access Point Protocol (IAPP) based handover when the roaming is determined as the intra-IP subnet roaming.

14. The access point (AP) device of claim 13, wherein the mobility information obtaining module comprises:

an extracting unit that extracts service et ID of an original AP device for the mobile terminal and MAC address of the mobile terminal from the received request;

a requesting unit that requests from a local authentication server for authentication of the mobile terminal and transmission of the mobility information of the mobile terminal based on the extracted service set ID of the original AP device and the MAC address of the mobile terminal; and a receiving unit that receives authentication information and the mobility information from the local authentication server.

15. The access point (AP) device of claim 13, wherein the handover module comprises:

a registering unit that registers IP address of a target foreign agent server with the home agent server and requests for updating binding when performing the MIP based handover;

a tunnel establishing unit that establishes a data forwarding tunnel between the target foreign agent server and the home agent server when performing the MIP based handover;

a context information transmitting unit that transmits MIP based handover associated context information relating to the mobile terminal between the target foreign agent server and an original foreign agent server for the mobile terminal when performing the MIP based handover, and receives IAPP based handover associated context information relating to the mobile terminal from the original AP device when performing the IAPP based handover; and a reconstructing unit that reconstructs user environment for the mobile terminal based on at least one of the MIP based handover and the IAPP based handover associated context information.

\* \* \* \* \*